(12) United States Patent
Jensen et al.

(10) Patent No.: US 12,409,690 B1
(45) Date of Patent: Sep. 9, 2025

(54) VEHICLE SUSPENSION ASSEMBLY

(71) Applicant: L&H Industrial, Inc., Gillette, WY (US)

(72) Inventors: Kirt J Jensen, Sheridan, WY (US); Daniel I Miachkov, Sheridan, WY (US)

(73) Assignee: L&H Industrial, Inc., Gillette, WY (US)

( * ) Notice: Subject to any disclaimer, the term of this patent is extended or adjusted under 35 U.S.C. 154(b) by 0 days.

(21) Appl. No.: 18/738,041

(22) Filed: Jun. 9, 2024

(51) Int. Cl.
*B60G 3/00* (2006.01)

(52) U.S. Cl.
CPC ............ *B60G 3/00* (2013.01); *B60G 2204/40* (2013.01)

(58) Field of Classification Search
CPC .................. B60G 3/00; B60G 2204/40; B60G 2204/41044; B60G 2204/423; F16F 9/36
USPC ............................ 188/322.16, 322.17, 322.18
See application file for complete search history.

(56) References Cited

U.S. PATENT DOCUMENTS

| | | | | |
|---|---|---|---|---|
| 2,545,394 A | * | 3/1951 | Thornhill | F16F 9/3278 188/322.18 |
| 3,223,401 A | * | 12/1965 | Peterson | F16F 9/486 277/630 |
| 3,791,495 A | * | 2/1974 | Keijzer | F16F 9/362 277/577 |
| 4,616,812 A | * | 10/1986 | Tornero | F16F 9/06 267/131 |
| 2011/0094833 A1 | * | 4/2011 | Marking | B60G 13/08 29/446 |
| 2016/0052590 A1 | * | 2/2016 | Yablon | F16F 9/44 188/297 |

* cited by examiner

*Primary Examiner* — Paul N Dickson
*Assistant Examiner* — Matthew Joseph Ganci
(74) *Attorney, Agent, or Firm* — FisherBroyles LLP; Ian R. Walsworth

(57) ABSTRACT

An improved suspension assembly that may be used as a new or retrofit to existing front and/or rear suspension systems. The assembly may include a multi-layered, press-fit wearband that is received by a modified suspension housing. The wearband is designed to ensure even lubrication, significantly enhancing durability and resistance to harsh conditions. The assembly further comprises a removeable head and retainer for ease of disassembly and reassembly.

13 Claims, 2 Drawing Sheets

VEHICLE SUSPENSION ASSEMBLY

FIELD OF THE INVENTION

The field of the invention generally relates to mining equipment and heavy machinery, including vehicles operating in continuous and/or extreme conditions. More specifically, this invention relates to an improved suspension assembly for use in the above-referenced vehicles.

BACKGROUND OF THE INVENTION

Mining and heavy equipment vehicles used in excavation/extraction of soil, minerals, etc. are commonly found in the fields of construction, mining, oil and gas, forestry, and the like. These types of vehicles are well known in the art, and may comprise at least a front and rear axle connected to wheels for supporting and transporting the weight of payload and/or other components associated with such equipment.

One exemplary vehicle is depicted in FIG. 1. In embodiments, vehicle 10 may be take a variety of forms for transporting soil, minerals, etc. As shown in FIG. 1, the vehicle 10 may comprise a front wheel 11 associated with a front strut 12, as well as a rear wheel 13 associated with a rear strut 14. The vehicle 10 also typically comprises a payload portion 15, a cab 16 and a frame 17. While this disclosure is directed primarily to front struts 12, those skilled in the art will realize that the principles described here are applicable to rear struts 14 as well. Further, this disclosure is not limited to the type of vehicle or truck 10 illustrated in FIG. 1.

One component occasionally employed in suspension assemblies is referred to as a wearband. Traditional wearbands in vehicles may fail prematurely due to inadequate material durability and/or poor lubrication distribution. Replacing wearbands and addressing internal component wear in a vehicle's suspension system often requires extensive disassembly and significant downtime, which is both labor-intensive and costly. Prior art wearbands also suffer from not distributing lubrication evenly across their surfaces, leading to increased friction and faster wear and/or premature failure. Accessing and repairing or replacing parts of the suspension assembly, such as seal lands within the housing, may be complex and technically challenging.

Due in part to their continuous operation and in part to the harsh environments where these types of machines are used, the above-described components are historically subject to extreme wear over time. More specifically, the front and/or rear strut and related suspension assemblies are subject to stresses caused in part by the weight of the equipment and in part by varying loads supported by the vehicle. These stresses are transmitted to the front/rear struts, which over time can wear down and/or deform.

In addition, the often hard, rocky surfaces the struts are exposed to may cause further wear and deformation to the assembly, as well as introduce sand, dirt, and debris to the assembly. During the winter season, water can penetrate the front/rear struts and freeze, causing additional and significant damage to the vehicle. These problems require periodic repairs and replacement of components resulting in downtime for the equipment, which can cost tens to hundreds of thousands of dollars in repairs alone. The loss in productivity is often measured in the hundreds of thousands of dollars.

The present invention solves these and other problems associated with the prior art, in part by providing a system for reducing undesired damage to a vehicle's front and/or rear strut assemblies, reducing wear and friction, avoiding attraction of dirt, debris or fluids that can cause interference, and allowing for faster, more accurate and safer installation of components of the system described herein. Other advantages and benefits will become apparent after reviewing the Summary and Detailed Description sections below.

SUMMARY OF THE INVENTION

U.S. patent application Ser. No. 15/959,117, filed on Apr. 20, 2018 and issued as U.S. Pat. No. 10,843,749 on Nov. 24, 2020, which is commonly owned by the Applicant, is hereby incorporated by reference in its entirety for the purpose of supplementing this disclosure, pursuant to 35 U.S.C. § 112. U.S. Pat. No. 10,843,749 is specifically incorporated for the purpose of describing various heavy equipment used for mining, oil and gas and related fields.

This present disclosure relates to a replaceable suspension assembly that is preferably for use with a front suspension system, but alternatively may be used in a rear suspension system.

One aspect of the present disclosure relates to a multi-layered, press-fit wearband that is designed to ensure even lubrication, significantly enhancing durability and resistance to harsh conditions.

According to embodiments, the enhanced wearband may comprise one or more grease grooves that promote effective lubrication flow from one side to the other, ensuring that all parts of the wearband are adequately lubricated and protected against wear.

Another aspect of the present disclosure relates to a removable head, which facilitates easier access to wearbands and critical seals found in suspension assemblies, and which simplifies the process of maintenance and replacement. The removable head also reduces labor and time required for repairs, thus minimizing downtime.

The removable head of the preferred embodiment allows for replacement or repair of damaged components, making it easier to manage wear without extensive mechanical intervention.

Another aspect is the unique makeup of the materials, including the wearband, which enhances its usefulness and operation lifecycle.

According to yet another aspect of the present disclosure, the suspension assembly comprises a modified housing adapted to accommodate an improved wearband and to facilitate the attachment of a bolt-on head.

Other aspects of the present disclosure address the frequent failures and complex maintenance procedures associated with front/rear strut and suspension assemblies, which can often lead to significant operational downtime and is costly for operations relying on the continuous-use vehicles. By extending the life of wearbands and simplifying the maintenance process, the present disclosure also reduces downtime associated with front/rear struts and suspension assemblies.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. Further details and other features will become apparent after review of the following Detailed Description and accompanying drawing figures.

One having skill in the art will appreciate that embodiments of the present disclosure may be constructed of materials known to provide, or predictably manufactured to provide the various aspects of the present disclosure. These materials may include, for example, steel, steel alloy, stainless steel, iron, cast iron, aluminum, aluminum alloy, chromium alloy, graphite, and other metals or metal alloys. The sealing material may include, for example, rubber, polyurethane, polyethylene, PTFE, UHMW, carbon fiber, resinous materials, and other plastic or synthetic materials.

As utilized herein, the phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being approximations which may be modified in all instances as required for a particular application of the novel apparatus described herein.

The term "a" or "an" entity, as used herein, refers to one or more of that entity. As such, the terms "a" (or "an"), "one or more" and "at least one" can be used interchangeably herein. The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112 (f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves. For the purpose of supplementing the written description for the present disclosure, the following U.S. patents and pending applications incorporated by reference: U.S. Pat. Nos. 10,865,541 and 10,843,749.

The Summary is neither intended, nor should it be construed, as being representative of the full extent and scope of the present disclosure. Moreover, references made herein to "the present disclosure" or aspects thereof should be understood to mean certain embodiments of the present disclosure and should not necessarily be construed as limiting all embodiments to a particular description. The present disclosure is set forth in various levels of detail in the Summary as well as in the attached drawings and the Detailed Description, and no limitation as to the scope of the present disclosure is intended by either the inclusion or non-inclusion of elements or components when describing certain embodiments herein. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure, and together with the Summary and the Detailed Description serve to explain the principles of these embodiments. In certain instances, details that are not necessary for an understanding of the disclosure or that render other details difficult to perceive may have been omitted. It should be understood, of course, that the present disclosure is not necessarily limited to the particular embodiments illustrated herein. Additionally, it should be understood that the drawings are not necessarily to scale.

In the drawings:

FIG. 1 is an elevation view of a prior art vehicle;

FIG. 2 is a perspective view of a suspension assembly according to embodiments of the present disclosure;

FIG. 3 is a detailed sectional view of the assembly of FIG. 2; and

FIG. 4 is another sectional view of a portion of the assembly shown in FIG. 3.

Figure 1:
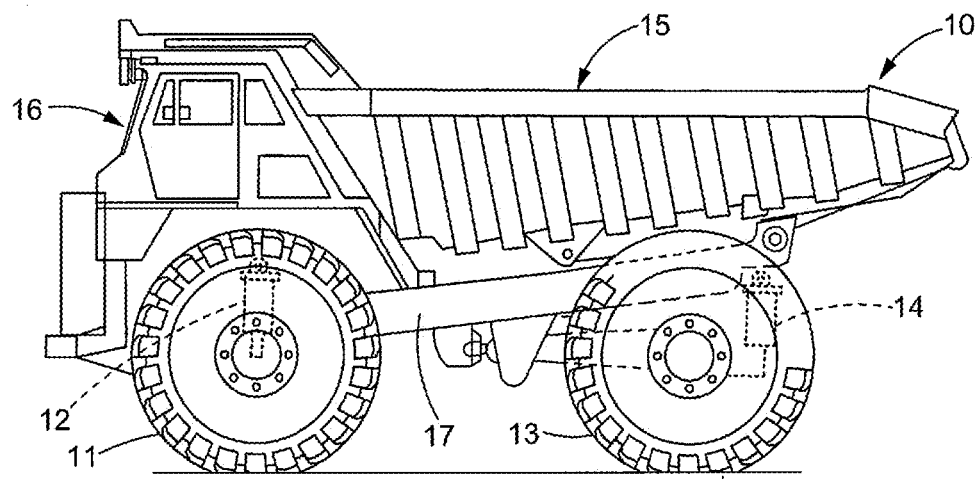

The following is a list of components and their associated reference number:

Ref #Component
10 Vehicle
11 Front Wheel
12 Front Strut
13 Rear Wheel
14 Rear Strut
15 Payload Portion (of Vehicle)
16 Cab
17 Frame (of Vehicle)
100 Suspension Assembly (Front)
101 Rod
102 Removable Head
103 Housing
104 Wiper
105 Head
106 Head Bolt
107 Plate
108 Plate Bolt
109 Removeable Head Bolt
110 Plate Washer
201 Seal
202 End Plate
203 O-ring
204 Retainer
301 Removeable Head O-ring
302 Wearband Similar components and/or features may have the same reference number. Components of the same type may be distinguished by a new reference number. If only the reference number is used, the description is applicable to any one of the similar components having the same reference number.

DETAILED DESCRIPTION

The present invention provides its benefits across a broad spectrum of endeavors. It is applicant's intent that this specification and the claims appended hereto be accorded a breadth in keeping with the scope and spirit of the invention being disclosed despite what might appear to be limiting language imposed by the requirements of referring to the specific examples disclosed. Thus, to acquaint persons skilled in the pertinent arts most closely related to the present invention, a preferred embodiment of the system is disclosed for the purpose of illustrating the nature of the invention. The exemplary method of installing, assembling and operating the system is described in detail according to the preferred embodiment, without attempting to describe all of the various forms and modifications in which the invention might be embodied. As such, the embodiments described herein are illustrative, and as will become apparent to those skilled in the art, can be modified in numerous ways within the scope and spirit of the invention, the invention being measured by the appended claims and not by the details of the specification.

In this Detailed Description, reference is made to the embodiments depicted in FIGS. 1-4. According to one embodiment, the system may be used with several types of vehicles, such as mining or oil and gas vehicles, and other types of heavy equipment. By way of example but not limitation, the present disclosure may be incorporated with an existing front suspension assembly. By way of example but not limitation, the suspension assembly may be for a Caterpillar 797 Haul Truck.

The invention comprises several components, each specifically designed to improve the reliability and longevity of a vehicle's suspension system: (1) A modified housing, which is adapted to accommodate an improved wearband and to facilitate the attachment of a bolt-on head; (2) an improved wearband, preferably made from a more durable material, designed to withstand harsh operational conditions and reduce wear; (3) an improved seal engineered to prevent grease from escaping the suspension system, thus maintaining optimal lubrication; (4) an improved wiper designed to prevent external materials from entering the suspension, helping to keep the system clean and functional; and (5) a removable head, preferably designed to house the improved seal and wiper, which allows for easier and quicker replacement of wearbands. Each of these components is described in greater detail below.

Referring now to FIG. 1, an exemplary mining vehicle according to the prior art is shown. Vehicle 10 may be specifically employed for transporting soil, minerals, etc. The vehicle 10 may comprise a front wheel 11 associated with a front strut 12 and a rear wheel 13 associated with a rear strut 14. The vehicle 10 also typically comprises a payload portion 15, a cab 16 and a frame 17. The following disclosure relates primarily to the front strut 12 and rear strut 14 of a vehicle 10. It is expressly understood that this disclosure is not limited to the type of vehicle 10 shown in FIG. 1.

Figure 2:
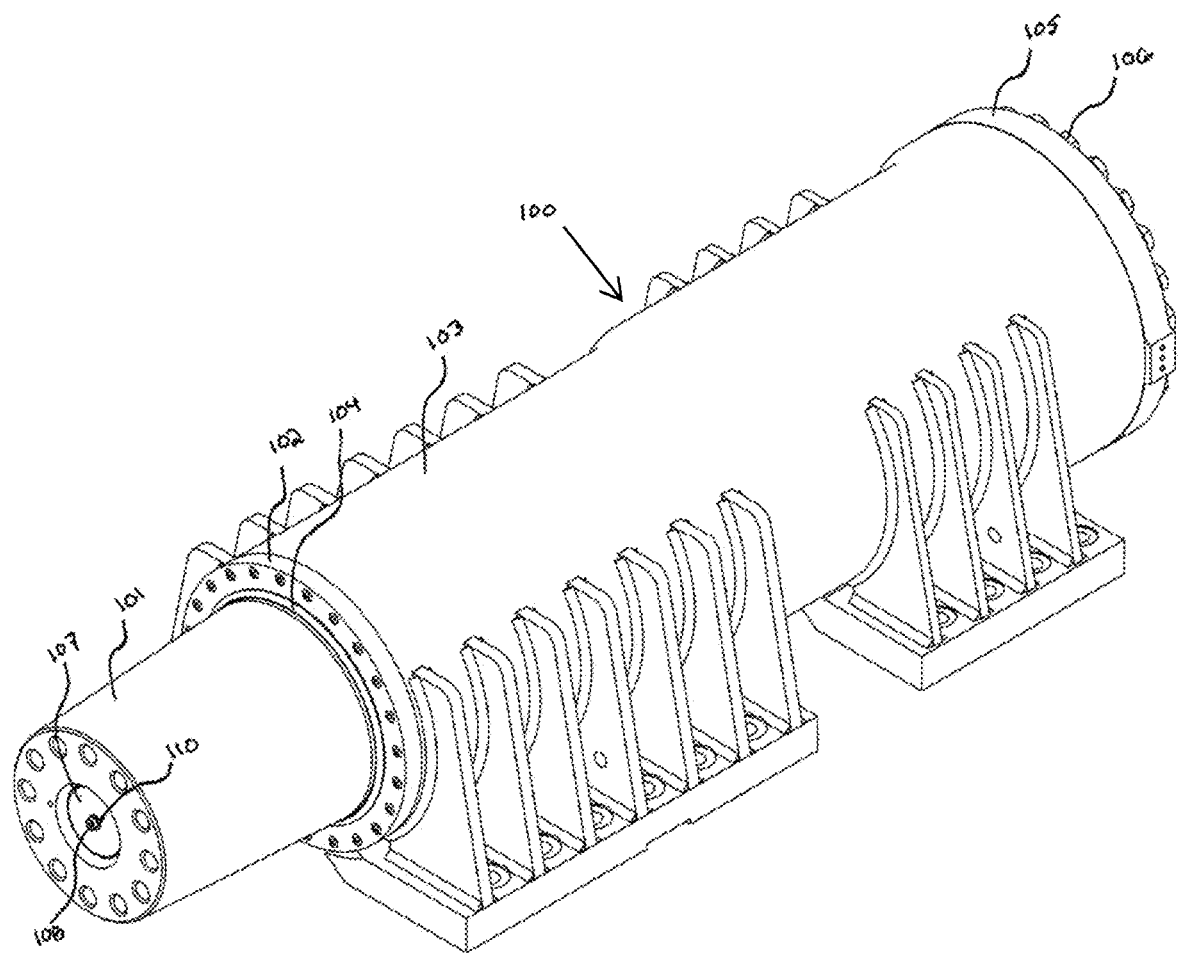

One embodiment of the present disclosure is illustrated in FIG. 2. Here, a front suspension assembly 100 is shown comprising: a rod 101, a removable head 102 and a housing 103. The removable head 102 is preferably secured to one end of the housing 103, such as by a plurality of removable head bolts 109. The removable head 102 is also preferably adjacent to an improved wiper 104, which is oriented to protect against external contaminants entering the housing and acts as the first line of defense, protecting the internal components from debris that can cause damage over time. At the opposite end of housing 103 is a head 105, which is preferably secured by head bolts 106. Rod 101 extends from housing 103 and terminates with plate 107. Plate 107 is preferably secured with a plate bolt 108 and plate washer 110 as shown in FIG. 2.

Figure 3:
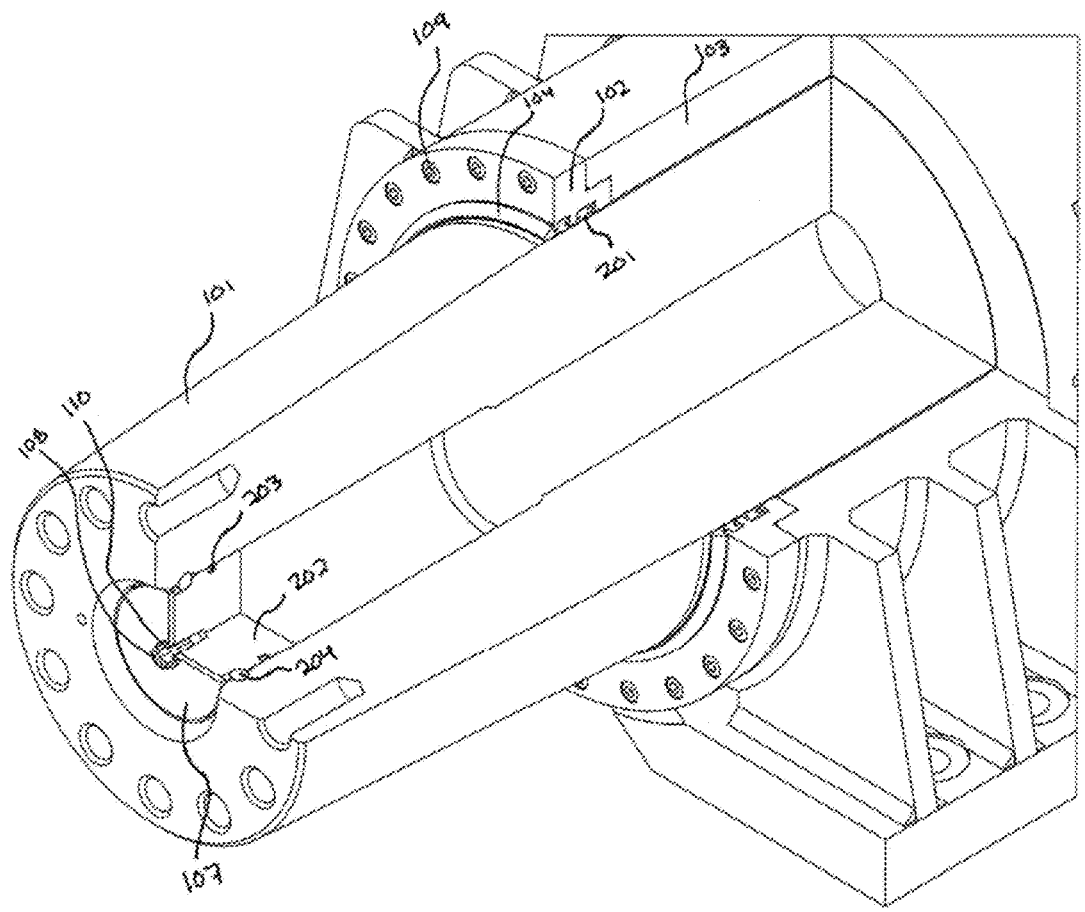

FIG. 3 depicts additional aspects of the present disclosure. Here, a partial sectional view shows details associated with the removeable head 102, which preferably comprises a keyed surface for mating with a notch in housing 103 as shown. Removeable head 102 also comprises a groove for an improved seal 201 along the outer circumference of rod 101, and further secures wiper 104 about the external surface of removeable head 102.

Referring now to rod 101, additional details are shown. The rod 101 has been improved by including a taper along only a portion of rod 101. This taper is in lieu of a step or a continuous taper commonly found on front suspension assemblies, and helps distribute stress along the length of the rod 101. The plate 107 is preferably coupled to end plate(s) 202, which include a notched surface for retaining O-ring 203. The O-ring 203 also provides protection against unwanted contaminants. The plate 107 also comprises a retainer 204. By providing easily accessible and/or removeable components, such as removeable head 102 and retainer 204, disassembly and reassembly is facilitated. For example, removable head 102 facilitates easier access to the interior of housing 103 and wearband 302 (described below), as well as critical seals found in typical suspension assemblies, which simplifies the process of maintenance and replacement.

Figure 4:
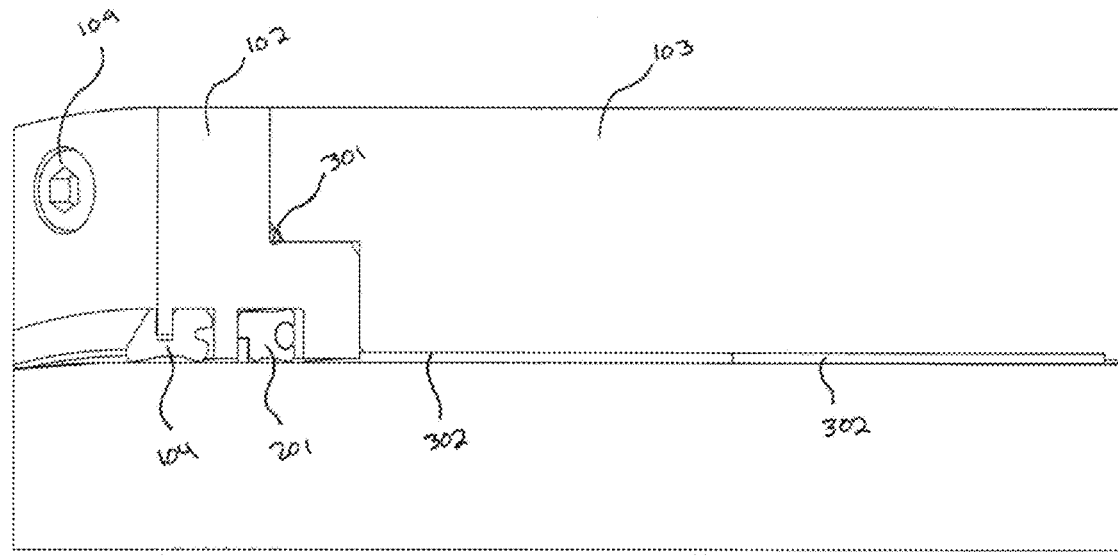

Referring now to FIG. 4, a detailed partial sectional view of the removeable head 102 and housing 103 is shown. Wiper 104 and seal 201 have been described previously, but are enlarged in FIG. 4 to demonstrate their placement in the portions of the removeable head 102 facing the rod 101. O-ring 301 may be provided between the removable head 102 and housing 103 as shown. This assembly permits ease of removal and reinstallation of parts when repairs or maintenance is needed. The housing 103 is preferably machined to permit an improved wearband 302 to be placed surrounding rod 101. Thus, according to a preferred embodiment, the wearband 302 is affixed to the housing 103, not the rod 101.

The wearband 302 may be made from multiple materials to extend operable life of the surrounding components. In one embodiment, wearband 302 is comprised of a metal-polymer blend. For example, the wearband 302 may comprise a high-tech polymer layer and a metal backing layer. The polymer layer may be lubricated independently, or may comprise a lubricant. In one specific embodiment, the wearband 302 may include a bronze sintered layer between the polymer and metal backing layers. The wearband 302 may be made from DX®10 supplied by Timken.

The wearband 302 may comprise one or more grooves for ease of lubrication. The grooves ensure lubrication flows effectively from one side of the wearband 302 to the other. This feature is critical for maintaining consistent lubrication across the entire wear surface, reducing the risk of hot spots and premature wear of wearband 302. Grease may be injected into the suspension assembly 100 on the top side of the wearband 302.

The present disclosure provides an effective and relatively quick manner of upgrading or enhancing a vehicle's strut and/or suspension assembly, including the vehicle types described above, while further reducing wear and potential damage to components throughout the life of the assembly and associated components. Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims).

To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, subparagraph (f).

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g. the use of a certain component described above alone or in conjunction with other components may comprise a system, while in other aspects the system may be the combination of all of the components described herein, and in different order than that employed for the purpose of communicating the novel aspects of the present disclosure. Other variations and modifications may be within the skill and knowledge of those in the art, after understanding the present disclosure. This method of disclosure is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A suspension assembly, comprising:
   a housing;
   a rod configured to be received within the housing;
   a removeable head configured to be placed around the rod and adjacent the housing;
   an improved wearband configured to be received within the housing and adjacent the rod, the wearband comprising at least a polymer layer, a metal layer, and a sintered layer between the polymer layer and the metal layer;
   an improved seal comprising a (plurality of grooves); and
   a wiper surrounding an outer portion of the removeable head;
   wherein the removeable head is adapted to receive at least one seal.

2. The suspension assembly of claim 1, wherein the wearband further comprises a metal-polymer blended material.

3. The suspension assembly of claim 1, wherein the sintered layer is comprised of bronze.

4. The suspension assembly of claim 1, wherein the at least one seal is an O-ring seal.

5. The suspension assembly of claim 1, wherein the plurality of grooves are configured to distribute at least one lubricant about both front and back sides of the wearband.

6. The suspension assembly of claim 5, wherein the at least one lubricant is grease.

7. The suspension assembly of claim 1, wherein the removeable head is attached to the suspension assembly by a plurality of fasteners for selective removal and reinstallation.

8. The suspension assembly of claim 1, wherein the rod comprises a taper along only a portion of rod.

9. The suspension assembly of claim 8, wherein the rod extends beyond one distal end of the housing and terminates with a plate.

10. The suspension assembly of claim 9, wherein the plate is preferably secured with one or more bolt and washer.

11. A suspension assembly comprising:
    a rod;
    a removable head;
    a housing;
    the removeable head configured to be secured to one distal end of the housing;
    the rod configured to be inserted into the housing and extend beyond the one distal end of the housing;
    a wiper placed about the rod and adjacent the removable head to protect against external contaminants;
    a wearband received within housing and in close proximity to an outer circumference of the rod, the wearband comprising a polymer layer, a metal layer, and a sintered layer between the polymer layer and the metal layer;
    a plate configured to be secured to a distal end of the rod which extends from the housing; and
    at least one seal received by the removeable head for sealing a portion of the suspension assembly.

12. The suspension assembly of claim 11, wherein the wearband further comprises a metal-polymer blended material.

13. The suspension assembly of claim 11, wherein the sintered layer is comprised of bronze.

\* \* \* \* \*